(12) United States Patent
Pusheck (10) Patent No.: US 10,451,645 B2
(45) Date of Patent: Oct. 22, 2019

(54) REMOTE SENSOR CONSTRUCTION VIA INTEGRATED VACUUM MANUFACTURE PROCESS

(71) Applicant: VEONEER US INC., Southfield, MI (US)

(72) Inventor: Jacob Pusheck, West Bloomfield, MI (US)

(73) Assignee: VEONEER US INC., Southfield, MI (US)

( * ) Notice: Subject to any disclaimer, the term of this patent is extended or adjusted under 35 U.S.C. 154(b) by 95 days.

(21) Appl. No.: 15/918,102

(22) Filed: Mar. 12, 2018

(65) Prior Publication Data

US 2019/0277872 A1    Sep. 12, 2019

(51) Int. Cl.
*G01P 1/02*    (2006.01)

(52) U.S. Cl.
CPC ........................ *G01P 1/02* (2013.01)

(58) Field of Classification Search
CPC .... G01P 1/02; H01L 23/495; H01L 23/49541; H01L 21/52; H01L 21/565; G01L 19/0084; G01L 19/142; G01D 11/245; G01D 11/30
See application file for complete search history.

(56) References Cited

U.S. PATENT DOCUMENTS

| 7,916,489 | B2 | 3/2011 | Okuya ............................ 361/752 |
| 8,966,975 | B2* | 3/2015 | Campbell ......... B29C 45/14655 73/493 |
| 9,107,309 | B2 | 8/2015 | Kurle |
| 9,470,595 | B2* | 10/2016 | Ramsay .............. G01L 19/0069 |
| 9,614,299 | B2 | 4/2017 | Ludwig et al. |
| 10,203,228 | B2* | 2/2019 | Forwerck ............ B60R 16/0231 |
| 10,340,211 | B1* | 7/2019 | Suwankasab ..... H01L 23/49541 |
| 2008/0287008 | A1* | 11/2008 | Watanabe ............. B29C 33/123 439/620.25 |
| 2010/0223995 | A1* | 9/2010 | Watanabe ............. B81B 7/0064 73/431 |
| 2010/0332074 | A1 | 12/2010 | Brisighella, Jr. et al. ...... 701/33 |
| 2012/0036930 | A1 | 2/2012 | Kunert ............................ 73/488 |
| 2012/0161362 | A1* | 6/2012 | Ludwig ................. H01L 21/565 264/272.14 |

(Continued)

FOREIGN PATENT DOCUMENTS

| DE | 102012202982 | 8/2013 | ............. F16B 19/00 |
| EP | 2036414 | 12/2007 | ............... H05K 7/14 |

*Primary Examiner* — Francis C Gray (74) *Attorney, Agent, or Firm* — Christopher P. Maiorana, PC (57) ABSTRACT

A remote sensor module includes a housing comprising a first cavity and a second cavity. A pocket in the first cavity may be configured to hold a sensor package. A side of the pocket may be formed by a portion of a wall between the first and second cavities, and provides an alignment surface for the sensor package. A port communicates through the wall between the pocket and the second cavity. A plurality of terminals extend through the wall between the first cavity and the second cavity. Each of the terminals extends into the first cavity, is positioned such that the sensor package, when present, is between the ends of the terminals and a recessed surface of the pocket, and is configured to form an electrical and mechanical connection with the sensor package, which may hold the sensor package in contact with the alignment surface.

20 Claims, 6 Drawing Sheets

(56) References Cited

U.S. PATENT DOCUMENTS

| | | | |
|---|---|---|---|
| 2012/0247205 A1 | 10/2012 | Hortig et al. | 73/431 |
| 2013/0044437 A1 | 2/2013 | Hortig et al. | 361/728 |
| 2014/0052341 A1 | 2/2014 | Leach et al. | 701/45 |
| 2014/0176130 A1* | 6/2014 | Bueno Palacios | G01B 7/30 324/207.25 |
| 2015/0268261 A1* | 9/2015 | Murray, Jr. | H01R 13/6683 73/493 |
| 2017/0176486 A1 | 6/2017 | Steinbrink et al. | |
| 2017/0343395 A1* | 11/2017 | Woernle | G01D 11/245 |

* cited by examiner

REMOTE SENSOR CONSTRUCTION VIA INTEGRATED VACUUM MANUFACTURE PROCESS

FIELD OF THE INVENTION

The invention relates to vehicle sensors generally and, more particularly, to a method and/or apparatus for implementing remote sensor construction via an integrated vacuum manufacture process.

BACKGROUND

There is currently a drive in the industry towards PCB-less sensors (e.g., sensors that do not require a printed circuit board (PCB)). PCB-less sensors have all the electrical components necessary to function fully in an application. A difficulty with this technology is the electrical connection as well as constraint of the sensor position within the sensor housing. With the advent of PCB-less sensor technology, orientation of a sensor into a housing is more challenging. Typically, a sensor has to be aligned accurately to a sheet metal surface to within specified angular tolerances. Achieving the angular tolerances specified by existing standards using conventional guide ribs with the associated tolerances is not cost effective. Conventional construction techniques can alter sensor alignment.

It would be desirable to implement remote sensor construction via an integrated vacuum manufacture process.

SUMMARY

The invention concerns a remote sensor module including a housing comprising a first cavity configured to receive a sensor package and a second cavity configured to receive an electrical connector. A pocket in the first cavity may be configured to hold the sensor package. A side of the pocket may be formed by a portion of a wall between the first cavity and the second cavity. The side of the pocket generally provides an alignment surface for the sensor package. A port generally communicates through the portion of the wall between the pocket and the second cavity. A plurality of terminals generally extend through the wall between the first cavity and the second cavity. An end of each of the terminals extends into the first cavity and is positioned such that the sensor package, when present in the pocket, is between the ends of the terminals and a recessed surface of the pocket. The end of each of the terminals may be configured to form an electrical and mechanical connection with a respective contact pad of the sensor package when the sensor package is in the pocket, such that the electrical and mechanical connections generally hold the sensor package in contact with the alignment surface.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing remote sensor construction via an integrated vacuum manufacture process that may (i) utilize a vacuum to hold a sensor package in alignment during assembly, (ii) provide a sensor housing having a vacuum port configured to hold a sensor package against an alignment surface when vacuum is applied, (iii) provide a sensor housing having an array of channels configured to hold a sensor package against a recessed (bottom) surface of the sensor housing when vacuum is applied, (iv) provide a sensor housing having a vacuum port configured to allow air to escape from a chamber during potting, (v) hold a sensor module in a predetermined position during a soldering process, (vi) reduce manufacturing cost, (vii) reduce molding costs, (viii) provide increased angular accuracy, (ix) reduce bubble formation in potting material, (x) reduce problems associated with potting bubbles, and/or (xi) be implemented as one or more steps of a manufacturing process.

In various embodiments, aspects of the invention may encompass a sensor housing assembly (or apparatus) and a method of manufacture that provide an improvement in connection with PCB-less sensors. In various embodiments, a sensor housing is provided in which a sensor package is biased against a wall of the sensor housing that is dimensionally controlled to a datum system. To bias the sensor package against the wall, features have been added to the sensor housing to allow a pressure difference to drive a movement of a sensor package into alignment. In an example, a pressure port is formed within the wall between a connector cavity and a sensor cavity. The pressure port allows the sensor package in the sensor cavity to be pulled against the wall when the pressure difference is applied to the connector cavity. The pressure port also allows for excess air trapped during a potting process to escape through the connector cavity.

In various embodiments, the sensor cavity includes a pocket having a recessed surface into which the sensor package may be placed. The pressure port may be located within a wall of the pocket. Grooves may be formed in the recessed surface of the pocket. The grooves may be in communication with the pressure port. The grooves generally allow the sensor package in the pocket to be pulled against the wall and the recessed surface of the pocket when the pressure difference is applied to the connector cavity. This ensures the sensor package does not move during transportations (movements) performed during assembly (e.g., on a manufacturing dial table). This also ensures that the sensor package sits flat against the recessed surface of the pocket. In various embodiments, the features may be molded into the housing to allow a vacuum to be pulled such that the vacuum will bias the sensor package against a controlled surface or contacts. Additional features beneath the sensor package may also be formed that allow the vacuum to be pulled underneath the sensor package, thus holding the sensor package against the housing during manufacturing. In various embodiments, advantages over conventional solutions may include reduced manufacturing cost, reduced molding costs, increased angular accuracy, and/or reduced bubble formation in the potting material as well as reduction in the problems associated with potting bubbles.

Figure 1:
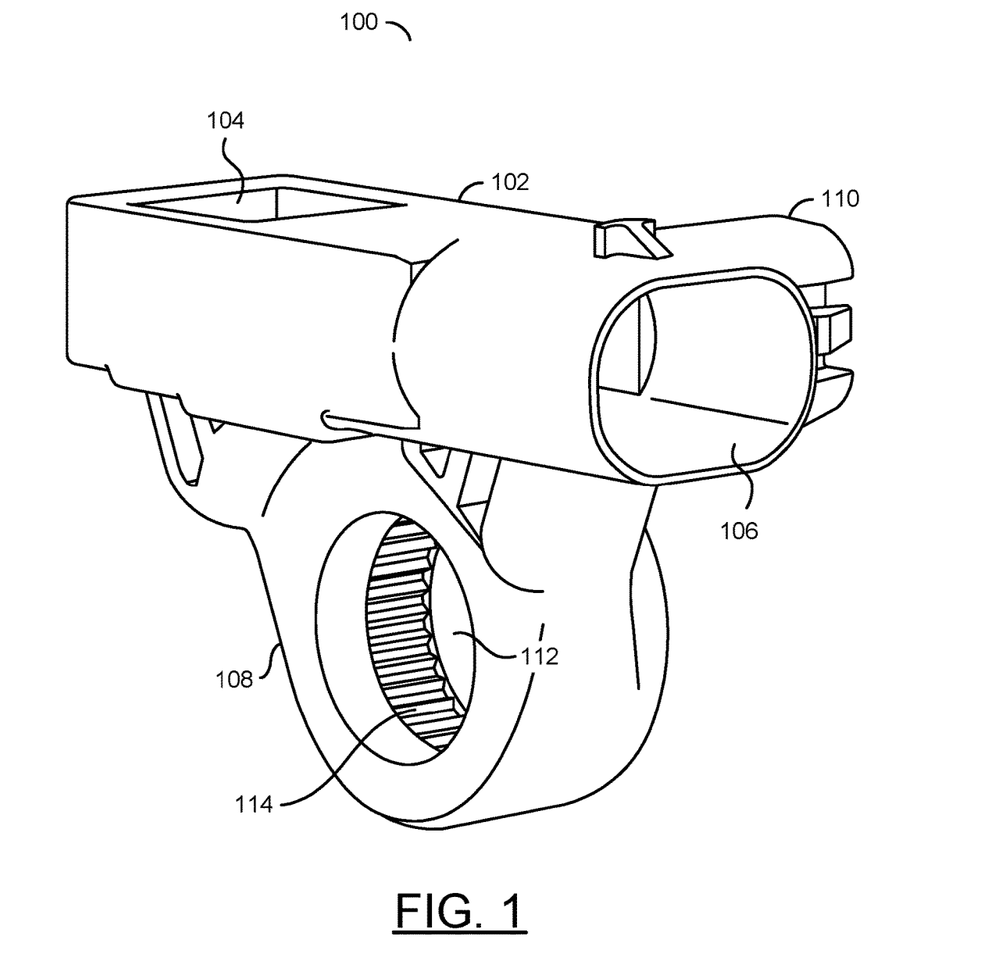
FIG. 1 is a diagram of a sensor housing in accordance with an example embodiment of the invention.

Referring to FIG. 1, a diagram is shown illustrating a sensor module 100 in accordance with an example embodiment of the invention. The sensor module (or apparatus or unit or device) 100 generally implements a kinematic sensor suitable for use in automotive applications. In an example, the sensor module 100 may be used to implement a remote sensor unit (RSU) that is part of a restraint control system of a vehicle. The sensor module 100 generally comprises a housing assembly 102. The housing assembly 102 may comprise a first cavity 104, a second cavity 106, a mounting boss 108 and a locating (or anti-rotation) tab 110.

The housing assembly 102 may be formed of a plastic material. In various embodiments, the plastic material may include, but is not limited to Nylon, PBT, polypropylene, PET, ABS, and/or various alloys and/or fillers of these resins. The housing assembly 102 may be formed using various techniques including, but not limited to casting, injection-molding, and three-dimensional printing. The housing assembly 102 may have a generally elongated shape. The first cavity 104 may be configured to receive a sensor package. The second cavity 106 may be configured to receive an electrical connector (e.g., for connecting the sensor module to the vehicle systems). The mounting boss 108 generally includes a mounting bore 112. The mount bore 112 is generally configured to receive a bolt for mounting the sensor module to a structure (e.g., frame or pillar of a vehicle, etc.). A bushing 114 may be disposed within the mounting bore 112. The bushing 114 may be configured to isolate the sensor module from the mounting structure.

The first cavity 104 is generally disposed at a first (back) end of the housing assembly 102. The first cavity 104 may be accessible through an opening in a top surface of the housing assembly 102. The first cavity and opening are generally shaped to receive and allow manipulation of a sensor package. The second cavity 106 may be formed at a second (front) end of the housing assembly 102, opposite from the first end. The second cavity 106 is generally accessible through an opening in the second end of the housing assembly 102. The second cavity 106 is generally shaped to receive an electrical socket (or plug) configured to make electrical connection(s) with pins (or terminals) connected to the sensor package in the first cavity 104 and extending through a wall into the second cavity 106.

The locating (or anti-rotation) tab 110 may be disposed along another side of the sensor cavity 106 and the socket cavity 108. The mounting boss 108 and the locating tab 110 are generally configured to facilitate locating the sensor module 100 to a vehicle structure (e.g., A-pillar, B-pillar, door panel, body panel, etc.). The locating tab 110 may include resilient tabs (barbs) providing a snap fit into a corresponding receiving hole of the vehicle structure to which the sensor module 100 is mounted. In various embodiments, a center axis of the mounting bore 112 may be aligned parallel to the locating tab 110. In an example, the mounting boss 108 may be askew of a centerline of the portion of the housing assembly 102 containing the first cavity 104 and the second cavity 106. Other arrangements of the mounting boss 108 and the location feature 110 may be implemented to meet the design criteria of a particular application.

Figure 2:
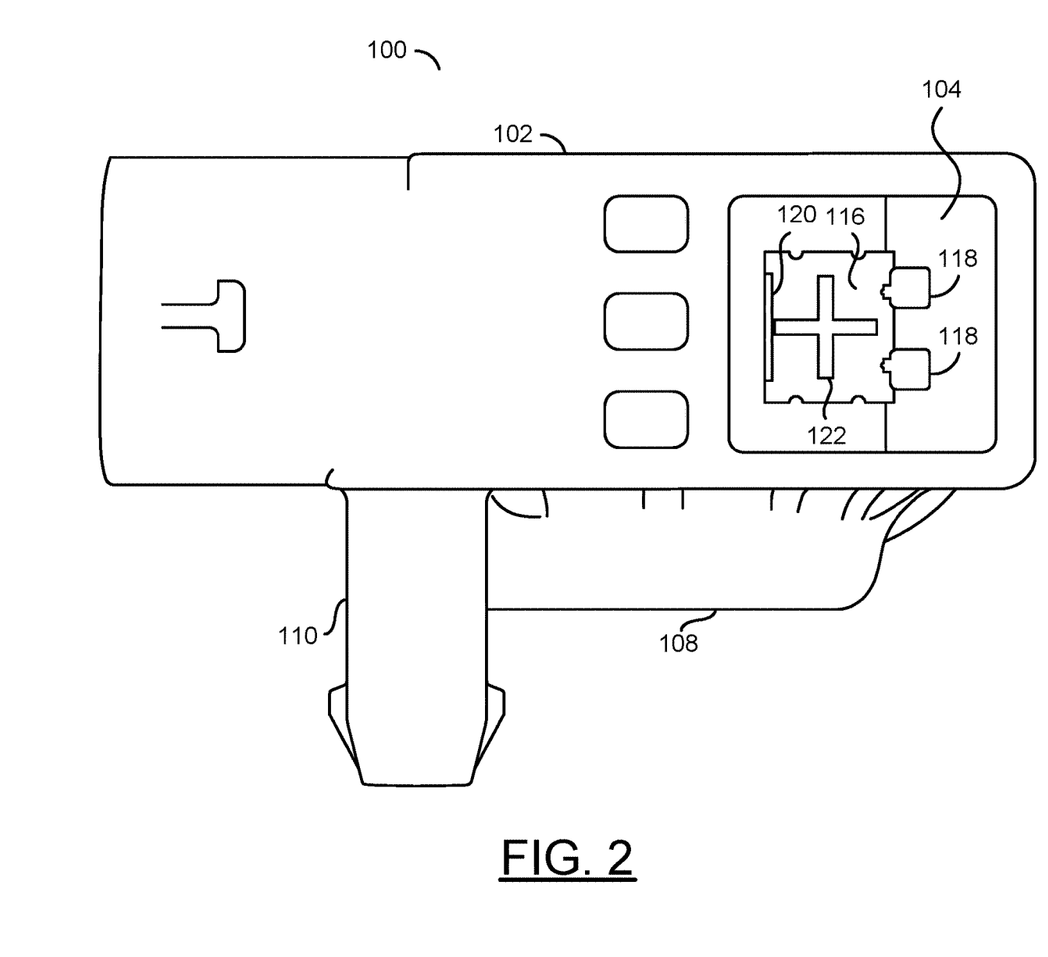
FIG. 2 is a diagram illustrating a top view of a sensor cavity of a sensor housing in accordance with an example embodiment of the invention.

Referring to FIG. 2, a diagram illustrating a sensor cavity of the sensor housing in accordance with an example embodiment of the invention. In various embodiments, the first (sensor) cavity 104 may include a pocket 116 and a number of stops (or ribs) 118. The pocket 116 is generally configured to accept a sensor package (not shown). The stops 118 are generally configured to loosely position the sensor package within the pocket 116. A first (front) side (wall) 120 of the pocket 116 is configured to provide an accurate alignment surface for the sensor package. The wall 120 is generally dimensionally controlled to a datum system. The wall 120 generally avoids using conventional guide ribs with associated tolerances to achieve the angular tolerances specified by existing standards, which is not cost effective. In various embodiments, the sensor package is biased against the wall 120 during assembly using a pressure difference (e.g., a vacuum pressure) applied to the housing assembly 102.

In some embodiments, a groove or grooves 122 may be formed in a recessed surface of the pocket 116. The grooves 122 allow the pressure difference (e.g., a vacuum pressure) applied to the housing assembly 102 to pull the sensor package against the recessed surface of the pocket 116. Pulling the sensor package against the recessed surface of the pocket 116 generally ensures the sensor does not move in response to transportations (movements) during assembly (e.g., on a manufacturing dial table). The groove(s) 122 also ensure that the sensor package sits flat against the recessed surface of the pocket 116.

Figure 3:
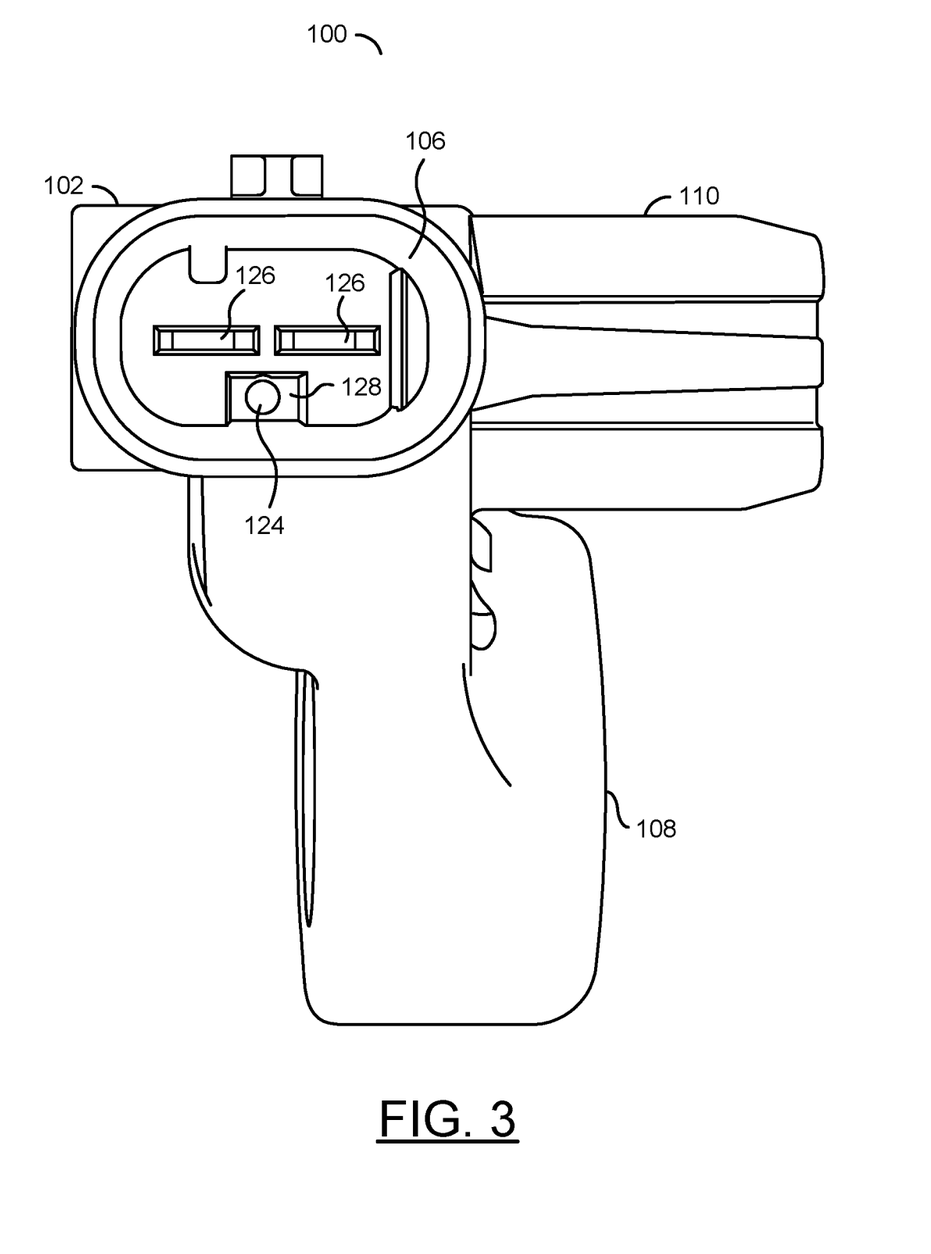
FIG. 3 is a diagram illustrating a connector cavity of a sensor housing in accordance with an example embodiment of the invention.

Referring to FIG. 3, a diagram illustrating a connector cavity of a sensor housing in accordance with an example embodiment of the invention. Multiple ports 124-126 may be formed in a back wall of the second (connector) cavity 106. The ports 124-126 may extend through the back wall and into the sensor cavity 104. The port 124 generally extends through the wall 120 of the pocket 116 in the sensor cavity 104. The port 124 generally provides a vent hole allowing air to be drawn out of or escape from the sensor cavity 104.

During manufacture, when the sensor package is placed in the pocket 116, a pressure difference may be applied to the cavity 106, drawing air out of the sensor cavity 104 through the port 124, pulling the sensor package against the wall 120 and/or the recessed surface of the pocket 116. In embodiments where a potting material is used to seal the sensor cavity 104, the port 124 may also allow trapped air and/or gases formed during the curing of the potting material to escape the sensor cavity 104.

A shape of the sensor cavity 104 and/or a surface texture of the wall(s) of the sensor cavity 104 may be designed such that gases may pass between and out the port 124 while the potting material is prevented from clogging the port 124. In an example, the port 124 may have a small diameter (e.g., ~1 mm) to limit air flow. In an example, a pocket 128 may be formed in the housing assembly 102 (e.g., during molding, casting, etc.). The pocket 128 may be configured to allow tooling to create the port 124 as part of the manufacturing process.

The ports 126 are generally configured to accept terminals (pins) for making electrical connections with the sensor package installed in the pocket 116. In an example, the ports 126 may be configured to allow terminals to be stitched through the back wall of the cavity 106. The ports 126 may be configured to ensure the terminals are aligned with the sensor package installed in the pocket 116 of the sensor cavity 104. In various embodiments, the ports 126 may be formed slightly smaller than the terminals such that an air-tight seam is formed between the terminals and the housing assembly 102. In some embodiments, the terminals may include barbs that lock the terminals into the ports 126. In some embodiments, the sensor cavity 104 may be configured (e.g., elongated) to allow access by a terminal stitcher tool to stitch terminals through the wall separating the cavities 104 and 106 from the sensor cavity 104 side.

Figure 4:
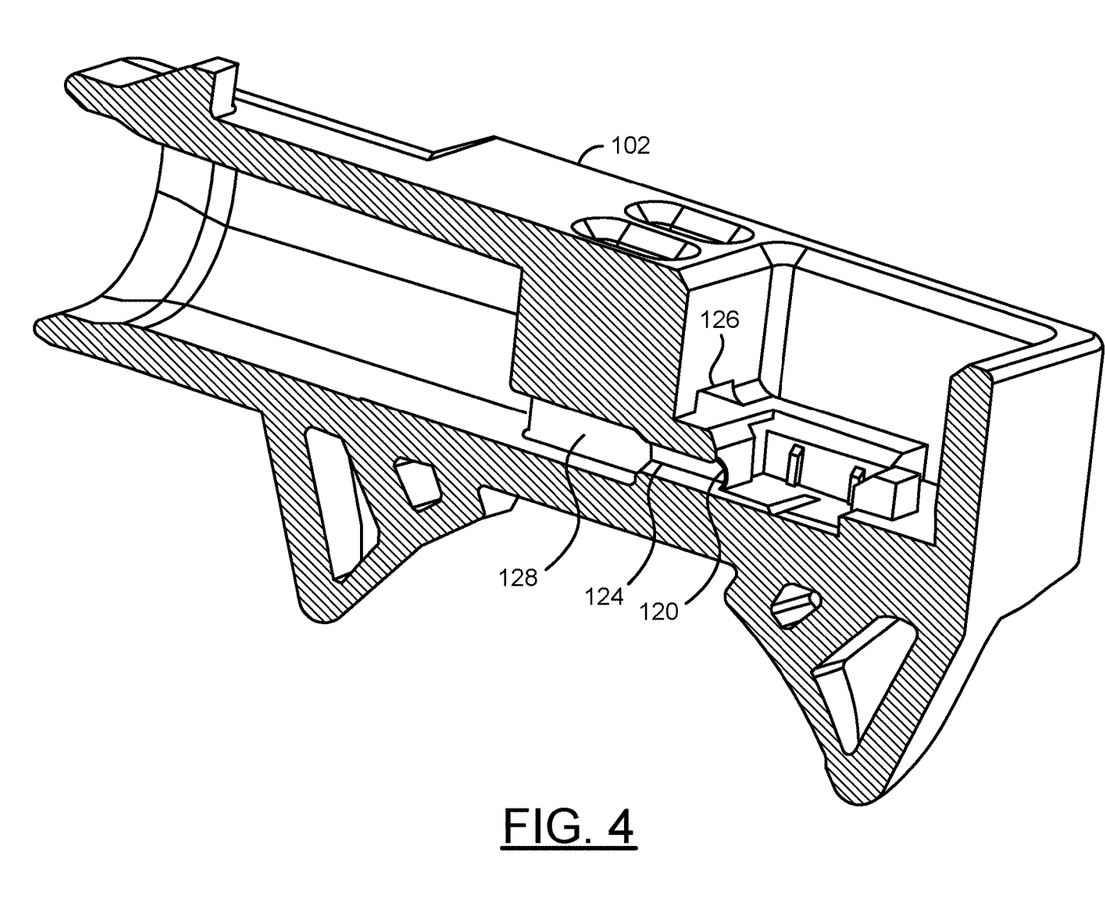
FIG. 4 is a diagram illustrating a cross-section of a sensor housing in accordance with an example embodiment of the invention.

Referring to FIG. 4, a diagram is shown illustrating a cross-section of a sensor housing in accordance with an example embodiment of the invention. The pocket 128 and the port 124 generally provide a channel communicating between the connector cavity 106 and the pocket 116 in the sensor cavity 104. The channel formed by the port 124 and the pocket 128 generally provides a path through which air may be drawn or escape from the cavity 104. The location of the port 124 in the wall 120 of the pocket 116 allows a pressure difference applied to the connector cavity 106 to pull a sensor package in the pocket 116 against the wall 120. By aligning the wall 120 with a system datum, the sensor package may be aligned with the system datum by the application of the pressure difference to the connector cavity 106.

The ports 126 generally allow terminals to be stitched into the housing assembly 102 above the sensor package in the pocket 116. In embodiments implementing the groove(s) 122 in the recessed surface of the pocket 116, application of the pressure difference to the connector cavity pulls the sensor package against the wall 120 ensuring alignment and against the recessed surface of the pocket 116 ensuring the sensor package is out of the way of the terminals being stitched through the ports 126. The sensor package may be locked into the aligned position by connecting the terminals in the ports 126 to contact pads on the sensor package while maintaining the pressure difference. In an example, an electrical and mechanical connection between the terminals and the sensor package may be formed by applying solder to holes in the terminals and performing a reflow operation.

The cavity 104 is generally configured to allow access for a soldering tool to make the connection between the terminals and the sensor package. When the connections have been made, the sensor cavity 104 may be sealed (e.g., by potting or capping). When the sensor cavity 104 is sealed by a potting material, the port 124 may allow air and gases to escape while blocking the potting material. Allowing the air and gases to escape may reduce occurrences of bubbles in the potting material.

Figure 5:
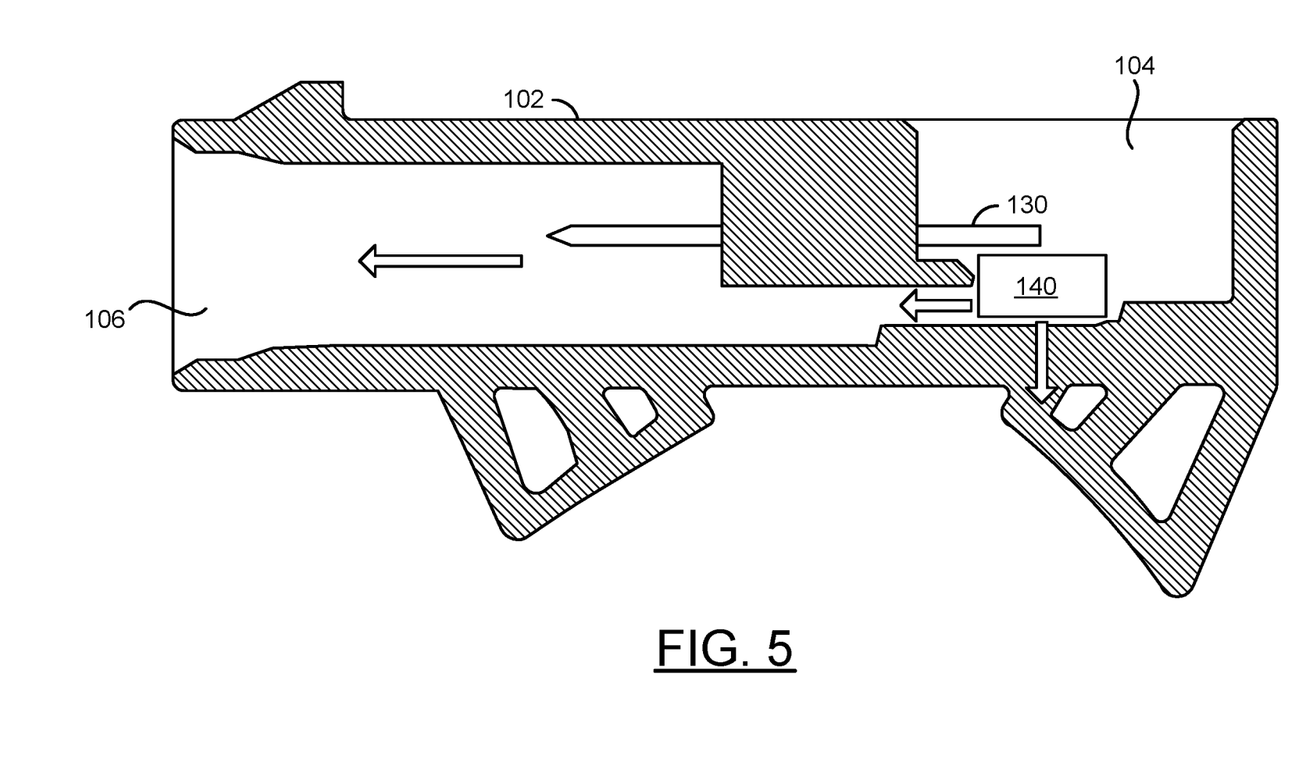
FIG. 5 is a diagram of a cross-section of a sensor housing illustrating a step of an integrated vacuum manufacture process in accordance with an example embodiment of the invention.

Referring to FIG. 5, a diagram of a cross-section of a sensor housing is shown illustrating a sensor package positioned in accordance with an example embodiment of the invention. In various embodiments, the sensor housing 102 in accordance with an example embodiment of the invention allows terminals 130 to be stitched into the sensor housing 102 through the connector cavity 106 to avoid hitting a sensor package 140 installed in the pocket 116 of the sensor cavity 104. The sensor package 140 may then be pulled into a desired alignment with the sensor housing 102 and terminals 130 by applying a pressure difference (e.g., a vacuum) to the connector cavity 106 (e.g., illustrated by arrows). In some embodiments, the sensor cavity 104 may be configured (e.g., elongated) to allow access by a terminal stitcher tool to stitch terminals through the wall separating the cavities 104 and 106 from the sensor cavity 104 side. A soldering operation may then be performed, connecting the terminals 130 to the sensor package 140, locking the sensor package 140 into the desired position/alignment. In an example, the terminals 130 may have holes (openings) into which solder may be deposited. A reflow operation may be performed allowing the solder to form electrical and mechanical connections between the terminals 130 and corresponding contact pads on a surface of the sensor package 140 facing the terminals 130. Once the solder cools, the sensor package 140 may be held in the desired position/alignment by the rigidity of the terminals 130.

Figure 6:
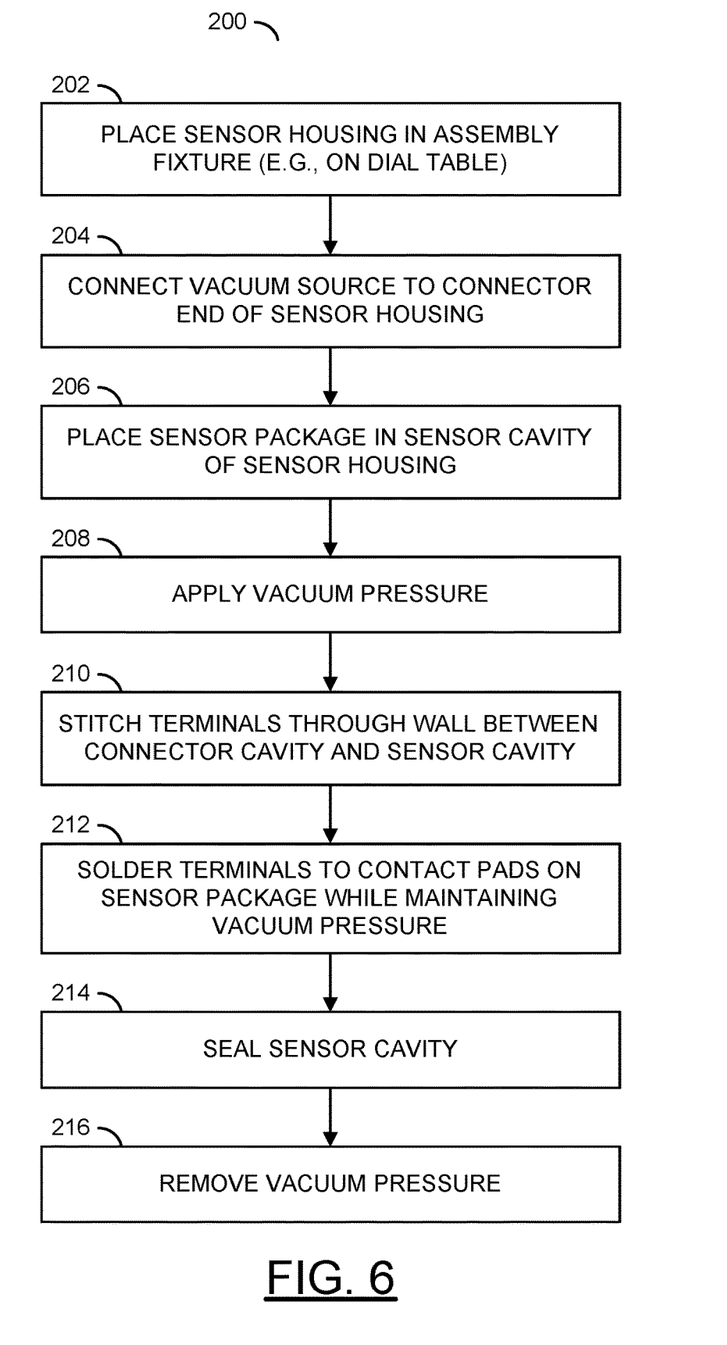
FIG. 6 is a flow diagram of a process in accordance with an example embodiment of the invention.

Referring to FIG. 6, a flow diagram is shown illustrating a manufacturing process in accordance with an example embodiment of the invention. In an example, a process (or method) 200 may be implemented to provide remote sensor construction via an integrated vacuum manufacturing process in accordance with an example embodiment of the invention. In an example, the process 200 may comprise a step (or phase) 202, a step (or phase) 204, a step (or phase) 206, a step (or phase) 208, a step (or phase) 210, a step (or phase) 212, a step (or phase) 214, and a step (or phase) 216. In the step 202, a sensor housing 102 (e.g., as described above in connection with FIGS. 1-5) may be placed into an assembly fixture (or jig). In an example, the assembly fixture may be on a manufacturing dial table allowing the fixture to be easily moved between a number of manufacturing tools.

In the step 204, the connector end of the sensor housing 102 may be connected to a vacuum source. The connection to the vacuum source may be configured to allow other tools (e.g., a terminal stitcher) to still access the connector cavity 106. In the step 206, a sensor package 140 may be positioned in the pocket 116 of the sensor cavity 104 of the sensor housing 102. In an example, a pick and place tool may be configured (e.g., programmed) to perform the step 206.

In the step 208, a pressure difference may be applied by the vacuum source connected to the connector end of the sensor housing 102. The pressure difference generally pulls the sensor package 140 against an alignment surface (front wall) and/or a recessed surface of the pocket 116. The alignment of the sensor package 140 with the alignment surface aligns the sensor package with a system datum to within a predetermined tolerance.

In the step 210, a number of terminals (pins) 130 may be stitched through the wall between the connector cavity 106 and the sensor cavity 104. In an example, a terminal stitching tool may be configured to perform the step 210. The terminals 130 are generally configured to extend away from the wall of the sensor cavity 104 and over contact pads on a top surface of the sensor package 140. In an example, the terminals 130 may have a hole through which solder may be placed to form an electrical and mechanical connection with the sensor package 140. The terminals 130 generally extend from the wall of the sensor cavity 104 a sufficient distance to place the hole over a center of the contact pads of the sensor package 140.

In the step 212, the terminals 130 may be soldered to the contact pads of the sensor package 140. In an example, a bead of solder may be deposited in holes of the terminals 130 and a reflow operation performed. In an example, a solder tool may be configured to perform the soldering step 212.

In the step 214, the sensor cavity may be sealed. In an example, a cap may be placed over the opening of the sensor cavity 104 and bonded (e.g., glued, fused, etc.) to the sensor housing 102. In another example, a potting material may be injected into the sensor cavity 104 and allowed to cure. In an example, the port 124 (and optional groove(s) 122) may allow air and gases to escape, reducing bubble formation in the potting material as well as reducing the problems associated with potting bubbles.

In the step 216, the pressure difference (e.g., vacuum source) may be removed. The sensor assembly may then be tested as part of the assembly process or removed from the assembly fixture and binned for subsequent testing. Although the application and removal of vacuum pressure are indicated as taking place in the steps 308 and 316, respectively, it would be apparent that the particular point(s) of application and/or removal of the vacuum pressure may be varied to meet the design criteria of a particular manufacture process implementation.

In various embodiments, a sensor package is biased against a wall of a sensor housing that is dimensionally controlled to a datum system. To bias this sensor against a wall, features have been added to the sensor housing to allow a pressure difference to drive the movement of the sensor package into alignment. In an example, a pressure port is formed within a wall between a connector cavity and a sensor cavity. The pressure port also allows for excess air trapped during a potting process to escape through the connector cavity.

In various embodiments, grooves may be formed to pull the sensor package against a recessed surface of a pocket in the sensor cavity. This ensures the sensor package does not move during transportations (movements) performed during assembly (e.g., on a manufacturing dial table). This also ensures that the sensors sit flat against the recessed surface of the pocket. In various embodiments, features may be molded into the housing to allow a vacuum to be pulled such that the vacuum will bias the sensor against a controlled surface or contacts. Additional features beneath the sensor may also be formed that allow the vacuum to be pulled underneath thus holding the sensor down during manufacturing. In various embodiments, advantages over conventional solutions may include reduced manufacturing cost, reduced molding costs, increased angular accuracy, and/or reduced bubble formation in the potting material as well as reduction in the problems associated with potting bubbles.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A remote sensor module comprising:
a housing comprising a first cavity configured to receive a sensor package and a second cavity configured to receive an electrical connector;
a pocket in said first cavity configured to hold said sensor package, wherein a side of said pocket is formed by a portion of a wall between said first cavity and said second cavity, and said side of said pocket provides an alignment surface for said sensor package;
a port communicating through said portion of said wall between said pocket and said second cavity; and
a plurality of terminals extending through said wall between said first cavity and said second cavity, wherein
an end of each of said terminals extends into said first cavity and is positioned such that said sensor package, when present in said pocket, is between said ends of said terminals and a recessed surface of said pocket, and
said end of each of said terminals is configured to form an electrical and mechanical connection with a respective contact pad of said sensor package when said sensor package is in said pocket, such that said electrical and mechanical connections hold said sensor package in contact with said alignment surface.

2. The remote sensor module according to claim 1, wherein said electrical and mechanical connections additionally hold said sensor package in contact with said recessed surface of said pocket.

3. The remote sensor module according to claim 1, wherein said port is configured to hold said sensor package against said alignment surface when a vacuum is applied to said second cavity.

4. The remote sensor module according to claim 1, wherein said recessed surface of said pocket comprises a pattern of channels in communication with said port.

5. The remote sensor module according to claim 4, wherein said pattern of channels and said port are configured to hold said sensor package against said alignment surface and said recessed surface of said pocket when a vacuum is applied to said second cavity.

6. The remote sensor module according to claim 1, wherein said electrical and mechanical connections are formed utilizing a solder reflow process.

7. The remote sensor module according to claim 1, wherein said sensor package comprises a kinematic sensor.

8. The remote sensor module according to claim 1, further comprising a locating feature configured to orient said module while said module is mounted to a structure that is part of a motor vehicle.

9. The remote sensor module according to claim 1, wherein said port is configured to allow air to be drawn from said first cavity to said second cavity when a vacuum is applied to said second cavity and to allow air to escape from said first cavity to said second cavity when said first cavity is being filled with a potting material.

10. The remote sensor module according to claim 9, wherein said port is further configured such that said sensor package blocks said potting material from passing or being drawn through said port by said vacuum when said first cavity is being filled with said potting material.

11. A method of manufacturing a remote sensor module comprising:
placing a sensor package in a pocket of a first cavity of a remote sensor module housing;
applying a vacuum to a second cavity of said remote sensor module housing, wherein a port communicates between said pocket and said second cavity and said vacuum is configured to pull said sensor package against an alignment surface of said pocket; and
maintaining said vacuum while forming electrical and mechanical connections between one or more terminals and one or more contact pads of said sensor package.

12. The method according to claim 11, wherein said electrical and mechanical connections hold said sensor package in contact with said alignment surface and a recessed surface of said pocket.

13. The method according to claim 11, wherein said electrical and mechanical connections are formed using a solder reflow process.

14. The method according to claim 11, further comprising filling said first cavity with a potting material.

15. The method according to claim 11, wherein said port is configured to hold said sensor package against said alignment surface when a vacuum is applied to said second cavity.

16. The method according to claim 11, wherein a recessed surface of said pocket comprises a pattern of channels connected to said port.

17. The method according to claim 16, wherein said pattern of channels and said port are configured to hold said sensor package against said alignment surface and said recessed surface of said pocket while said vacuum is applied to said second cavity.

18. The method according to claim 11, wherein said sensor package comprises a kinematic sensor.

19. The method according to claim 11, wherein said sensor package is configured to communicate information to a restraint control system.

20. A remote sensor unit comprising:
a sensor package; and
a housing comprising a first cavity, a second cavity, and a port, wherein said second cavity is configured to receive an electrical connector, said first cavity comprises a pocket configured to hold said sensor package, a side of said pocket is formed by a portion of a wall between said first cavity and said second cavity and provides an alignment surface for said sensor package, said port communicates through said portion of said wall between said pocket and said second cavity, a plurality of terminals extends through said wall between said first cavity and said second cavity, an end of each of said terminals extends into said first cavity and is positioned such that said sensor package is between said ends of said terminals and a recessed surface of said pocket, and said end of each of said terminals is configured to form an electrical and mechanical connection with a respective contact pad of said sensor package, such that said electrical and mechanical connections hold said sensor package in contact with said alignment surface and said recessed surface of said pocket, and said sensor is aligned to said alignment surface and said recessed surface of said pocket to within one or more predefined criteria.

* * * * *